United States Patent

[11] 3,611,029

[72] Inventor Thomas H. Stix
  Rehovot, Israel
[21] Appl. No. 856,337
[22] Filed Sept. 9, 1969
[45] Patented Oct. 5, 1971
[73] Assignee The United States of America as represented by the United States Atomic Energy Commission

[54] SOURCE FOR HIGHLY STRIPPED IONS
  5 Claims, 11 Drawing Figs.
[52] U.S. Cl. .................................................... 317/4,
  313/63
[51] Int. Cl. ..................................................... H05b
[50] Field of Search ............................................ 313/61, 63,
  182, 216, 230; 315/111; 176/1, 2, 5; 310/11

[56]   References Cited
  UNITED STATES PATENTS
  3,421,035  1/1969  Brubaker ..................... 313/63
  3,441,756  4/1969  Janes et al. ................... 310/11

Primary Examiner—Lee T. Hix
Attorney—Roland A. Anderson

ABSTRACT: Apparatus for producing highly stripped ions by sufficient exposure of these ions to a cloud of energetic electrons, for producing an electrostatic negative potential well capable of confining these ions during the stripping process, for creating magnetic and electrostatic forces capable of confining the energetic electrons forming the electron cloud with only a low rate of electron loss and a slow dissipation of electron energy, and contemplating means for producing a transverse electric field that removes electrons undesirably trapped in electrostatic positive potential maxima.

INVENTOR.
THOMAS H. STIX

INVENTOR.
THOMAS H. STIX

INVENTOR.
THOMAS H. STIX 3,611,029

SOURCE FOR HIGHLY STRIPPED IONS

BACKGROUND OF THE INVENTION

This invention, made in the course of, or under a contract with the United States Atomic Energy Commission, relates generally to ion sources, and more particularly to an improved source for producing highly stripped heavy ions. One method for producing ions comprises the well-known Philips Ionization Gauge (P.I.G.) for producing ions in a Penning type discharge, as described on p. 152 et seq. of "Controlled Thermonuclear Reactions" by Glasstone and Lovberg, Van Nostrand, 1960, and p. 90 et seq. of "Particle Accelerators" by Livingston and Blewett, McGraw Hill, 1962. Basically, this system comprises a tubular anode interposed between two spaced apart cathodes at the opposite ends of the anode and means for producing a steady state magnetic field parallel to the axis of the tubular anode. In operation ions continuously form with some of the ions being accelerated back to the perforated cathode where they produce secondary electrons and the magnetic field prevents these secondaries from immediately reaching the anode whereby the secondary electrons oscillate back and forth between the two cathodes to produce more ions. Heretofore, however, these devices have lacked provision for ion confinement, have produced low-energy protons, have had high dissipation, or have contained large numbers of neutral particles. It is additionally advantageous to provide fully stripped heavy ions above hydrogen in the periodic table for use in the fields of low-energy physics, medical application, or acceleration in conventional accelerators.

SUMMARY OF THE DISCLOSURE

This invention provides an improved ion source for producing highly stripped ions by their sufficient exposure to a cloud of reactively confined energetic electrons and for confining these ions in an electrostatic negative potential well during the period of their exposure and for ejecting them therefrom when desired. More particularly, in one embodiment this device comprises means for producing an axial static magnetic field and, with spaced apart cathodes and anodes, for producing a double-humped electrostatic potential profile parallel to the magnetic field such that energetic electrons are, with low particle loss and with low dissipation, confined transversely by the magnetic field and axially by the electric potential, which is almost everywhere positive with respect to the cathodes, and also such that ions are confined transversely by the electric field due to the negative space charge of the cloud of electrons thus confined, and confined axially by the electric potential minimum in between the two positive electrostatic humps. In another aspect, this invention provides means for producing a transverse electric field that removes electrons undesirably trapped in positive potential maxima and also means for producing a slab-shaped cloud of energetic electrons between said anodes for ionizing said ions in said electrostatic well profile. With proper selection of components and parameters as described in more detail hereinafter, the desired ions are produced and confined in said well and ejected therefrom.

DETAILED DESCRIPTION OF THE PREFERRED EMBODIMENT

Figure 1:
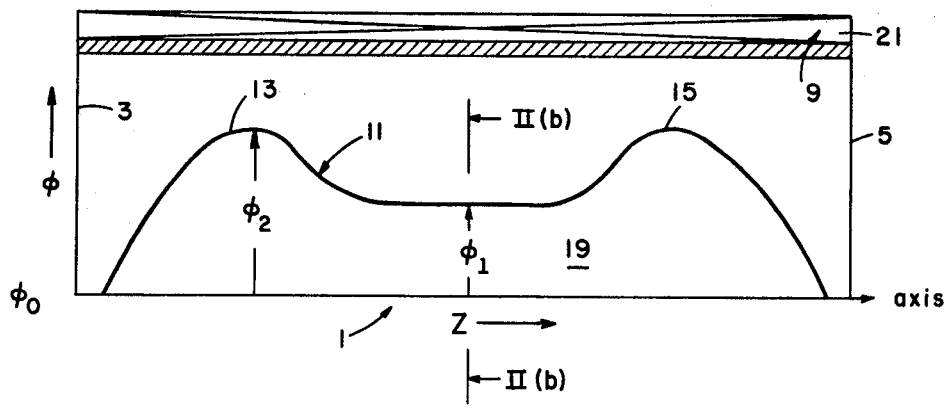
FIG. 1 is a sketch of potential in the modified P.I.G. geometry of this invention. The potential, $\Phi$, is plotted versus the distance $z$, parallel to the magnetic field. Ions are confined by the potential $\Phi_2-\Phi$, electrons are confined by the potential $-(\Phi_o-\Phi)$.

This invention has particularly utility in providing a source of highly stripped ions, comprising heavy ions, for the production of transuranium elements. To this end, this invention provides an ion source for conventional accelerators that accelerate the ions against suitable targets, such as complex nuclei. However, the ion source of this invention also provides ions for any of a wide variety of other applications, comprising low-energy and high-energy physics, and/or medical applications. The IEEE Trans. on Nuclear Science "NS-14," No. 3, 7(1967), has discussed the difficulties of heavy nucleus acceleration, and the Berkley group had proposed a new device utilizing injection, acceleration, foil-stripping and reacceleration to achieve a desirable output energy. However, it has been pointed out regarding the HIPAC system of U.S. Pat. No. 3,441,756, and in Dubna Preprint P7–4124 (1968), that a high degree of electron-stripping may be obtained by confinement of heavy ions in the electrostatic potential well of an electron plasma, and by the exposure of these ions to the energetic electrons in this plasma. The impressive significance of this concept is that the availability of a proper source of prestripped ions would make possible the efficient acceleration of heavy nuclei in conventional accelerators, such as cyclotrons, synchrotrons, of Van de Graaf brand electrostatic accelerators.

A description of the entrapment of positive ions in the negative space charge of a cylindrical electron beam appears in Elec. Commun. 24, 108 (1947). The experimental results described herein comprise observation of enhanced positive ion trapping when biasing electrodes at each end of a drift tube so as to create a pair of small ($\approx 15$v.) positive potential hills. Further reports on this concept appeared in Proc. Inst. Radio Engrs. 42, 1,548 (1954) and J. Appl. Phys. 26, 1,157 (1955) where, with the addition of an axial magnetic field for collimating the electrons, the description reports the prevention of longitudinal ion drain from one or both ends of a positive potential barrier. The thrust of these reports, however, comprises the reduction of the electrostatic dispersion in focusing the electron stream inside various electron tube devices.

A second group of reports on ion sources for mass spectrometers, describes multiple ionization in a source having ion trapping, both axially and radially, by the space potential of a magnetically collimated electron beam. Also, Can. J. Phys. 45, 1,791 (1967) describes ion charge multiplicity up to $Z = XE$ from a mass spectrometer source with both magnetic collimation and with a pair of ion barrier electrodes.

A common feature of the above-mentioned references comprises the collection of electrons at an anode biased at or very close to the maximum positive potential. However, the cross sections for stripping become small at high $Z$ values, and to achieve reasonable stripped-ion production rates requires a large flux of electrons in the 5–10 k.e. v. range. If then, as described in the above-mentioned references, the ionizing electrons make only a single transit through the trapped-ion region and then strike the anode with their maximum velocity, these systems have an extremely low efficiency of production, and reasonable production rates may require megawatts of power.

On the other hand, the toroidal geometry of the above-mentioned HIPAC system of U.S. Pat. 3,441,756 comprises the reactive storing of the electron energy, thereby to prevent dissipation except by atomic or cooperative plasma processes. In accordance with this invention, therefore, a linear multiple-transit trapped-ion source reactively stores the electron energy.

To this end, as in the above-mentioned HIPAC system where a high degree of electron-stripping occurs by ionization of heavy ions by the energetic electrons in this plasma, the apparatus of this invention utilizes this significant feature. However, in accordance with this invention, this energetic plasma provides both ion confinement and stripping. To this end, whereas the HIPAC has a toroidal configuration and employs a rising magnetic field for electron injection, this invention employs a modified P.I.G. configuration of improved geometry, having a longitudinally extended slab-shaped electron cloud, end injection, and a steady-state magnetic field. This invention thus has significant differences from both the HIPAC system, and conventional P.I.G. devices.

In understanding how the reactive trapped-ion source of this invention, referred to as an *rti* source, employs slab geometry, end injection, and steady-state magnetic field, as well known in the P.I.G. art, this invention replaces the conventional anode collector in a P.I.G. by a reflector electrode biased approximately to the cathode potential, thus reactively to confine the electron plasma in a modified Philips Ionization Gauge configuration. Moreover, this invention modifies the latter by introducing a pair of electrodes to create a double-humped, ion-confining electrostatic potential profile. Additionally, since these axial ion barriers tend to trap electrons so as to become reduced in strength, this invention adds a transverse electric field to remove those electrons trapped in the ion-confining potential maxima. Also, as described in more detail hereinafter, the modified P.I.G. geometry of this invention has particular quantitative relations for the electrostatic potentials; in one embodiment utilizes the diocotron instability, and establishes a desired ionization rate. Additionally, the following discusses the relaxation of the electron distribution function, the gradual neutralization of the ion-confining potential maxima through the accumulation of the trapped electrons, and method and apparatus for ejecting the trapped electrons by E×B drift. Finally, the following discusses the accumulation of the trapped ions and ion ejection mechanisms. To aid in this discussion, the following provides a description of one embodiment of this invention.

As understood in more detail hereinafter, this embodiment forms an "*rti*" source envisioned as an electrostatic potential well for ion confinement. To this end, electrodes external to the ion plasma create a double-humped electrostatic profile which confines the ions in their motion parallel to the magnetic field, while the space charge of a magnetically confined electron plasma produces an ion-confining well perpendicular to the magnetic field. In turn, negatively biased end plates, as in the conventional P.I.G. geometry, confine the electrons parallel to the magnetic field.

Referring now more particularly to apparatus 1 of FIG. 1, this embodiment has a vacuum electric potential as a function of distance parallel to a conventional, static, magnetic field, such as in a P.I.G. device. In this illustration of FIG. 1 herein, end plates 3 and 5, negatively biased with respect to a central region 7, locate in a static magnetic field produced by means 9, and produce a double-humped electrostatic potential profile 11. The region of ion confinement of the system of FIG. 1 thus comprises a potential well 11 between two potential humps 13 and 15.

Ions in the regions exterior to the potential humps 13 and 15 fall quickly into the negative end plates to provide an ion population of transiting particles within these exterior regions, and this population comprises transiting particles only. However, the electron population in the exterior regions corresponds substantially identically with the interior electron population in potential well 11. Therefore, space-charge effects of the unneutralized electron cloud in the exterior regions place a limit on the charged particle density, wherein a crude estimate of the allowable plasma radius (e.g., the plasma sheet thickness) simply corresponds to the Debye shielding distance for $kT_e$  $e(\Phi_{max}-\Phi_{min})$.

Figure 2A:
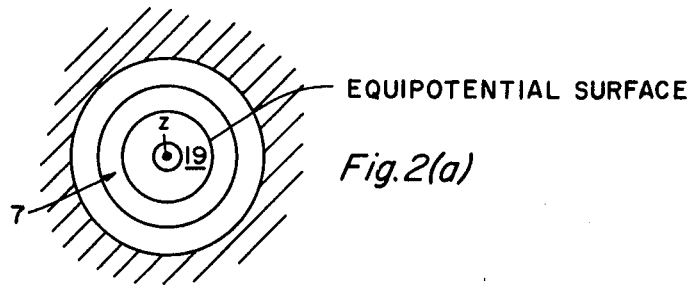
FIG. 2(a) and FIG. 2(b) are sketches of equipotential lines, $\Phi$ = constant, in a plane perpendicular to the magnetic field. Two possible configurations are illustrated. Shaded region represents conducting boundary. Potential well is created by the space charge of the electron cloud.
Figure 2B:
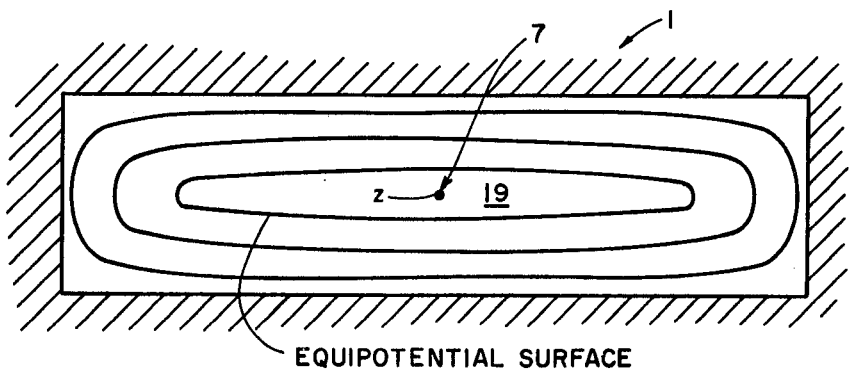

FIGS. 2a and 2b illustrate possible shapes for the equipotential surface in a plane perpendicular to the magnetic field for a cylindrical configuration, and in the preferred rectangular embodiment of this invention, the latter providing a slab-shaped electron cloud. For constant uniform density of electron space-charge, an increase in cylindrical radius in the configuration 11 of FIG. 2a, proportionally corresponds to thickness, approximately independently of the width. Thus, the same well depth of the device of FIG. 2b tends to hold more electrons per unit length than the charge cylinder 11 of FIG. 2a. Accordingly, the following discusses the charge slab embodiment 1 of this invention having a slab width much greater than the slab thickness. In this regard, for ease of explanation, the following discussion pertaining to the charge slab embodiment 1 employs two-dimensional (infinite width) approximations where appropriate. Thus, for example, the depth of the potential of the well 11 of FIG. 2b, perpendicular to the magnetic field, for a uniform density electron space charge, is approximately $$\Delta\phi(z) \approx \frac{\pi n_e(z)ed^2}{2} = 2.26 \times 10^{-7} n_e d^2 \text{ volts} \quad (1)$$

where $n_e(z)$ equals the electron density in cm.$^{13}$ and $d$ equals the slab thickness in cm.

To stabilize long wavelength (small $k_z$) instabilities, sometimes classified as diocotron or slipping stream instabilities, in a uniformly dense slab of electrons in a uniform magnetic field, the device of FIG. 2b utilizes suitably conducting walls. Short wavelength instabilities with a growth rate proportional to the square of the electric field perturbation at the top of the slab due to a rippled boundary along the slab bottom, i.e., $\omega i$ $exp-2kzd$, classified in the same category, also occur. These short wavelength instabilities may have wavelengths with Doppler frequency between ripples drifting with E×B velocity along the slab top and bottom is greater than the electron cyclotron frequency, that is, $k_z\Delta v = k_z(E^{(o)}\text{top}-E^{(o)}\text{bottom})c/B \gtrsim eB/m_ec$.

Accordingly, differentiation of eq. (1) yields the electric fields. Substitution for $k_z$ then yields $\omega_i$ $exp-(2/q)$ or in more detail, $$\omega_i \approx \frac{1}{2}q\omega_{ce}exp-(2/q) \quad (2)$$

$$q \equiv \frac{\omega^2_{pe}}{\omega^2_{ce}} = \frac{4\pi n_e m_e c^2}{B^2} = 1.03 \times 10^{-5} \frac{n_e}{B^2} \quad (3)$$

with $B$ in gauss. Since the diocotron growth rate of eq. (2) has enormous sensitivity to the value of the electron plasma, the plasma "$q$-criterion" advantageously corresponds to from $q \cong 0.07$ to $q \cong 0.12$.

The combination of equations (1) and (3) provides a scaling law for the *rti* source 1 of this invention having the double-humped potential profile 11 of FIG. 2b. The total rate of ionization comprises:

$$\frac{dN_j}{dt} = n_e n_{j-1} \langle \sigma v_e \rangle_j \cdot Ad \quad (4)$$

where $N_j$ equals the total number of ions of charge $j$, $n_j$ equals the average density of ions of charge $j$ and $\langle \sigma v_e \rangle_j$ equals the ionization rate factor. The active volume equals the slab area, $A$, times the thickness, $d$. Elimination of $n_e$ and $d$ yields $$\frac{dN_j}{dt} = 6.4 \times 10^{10} \frac{n_{j-1}}{n_e} \langle \sigma v_e \rangle (\Delta\phi)^{\frac{1}{2}} q^{3/2} AB^3 \text{ ions/sec.} \quad (5)$$

with $\Phi$ in volts, $B$ in gauss, $\sigma v$ in cm.$^3$/sec., and $A$ in cm.$^2$.

This slab geometry of this invention also provides for the ejection of electrons undesirably trapped in potential maxima. In this regard, the electrons undergo collisions with ions and other electrons and tend to thermalize. Reaching isotropy in velocity space alone robs these electrons of two-thirds of their initial energy parallel to the magnetic field, and thus strongly traps them desirably inside the anode volume. Further collisions produce electron velocities closely approaching Maxwellian distribution, and the electron density thus tends to vary as $exp(e\Phi(z)/kT_e)$. This thermalization proceeds on a time scale given by electron self-collision time, approximately $$t_c \approx 1.6 \times 10^4 \frac{(kT_e)^{3/2}}{n_e} \text{ seconds} \qquad (6)$$

with $kT_e$ in electron volts.

Figure 3A:
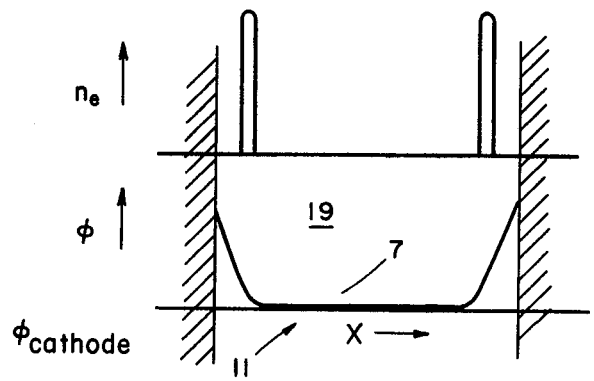
FIG. 3(a), FIG. 3(b) and FIG. 3(c) are sketches of possible electron density and potential profiles in the anode region of a P.I.G. device. The density profile in (b) and (c) is broadened by the diocotron instability. Limiting the cathode emission eliminates the virtual cathode in (c).
Figure 3B:
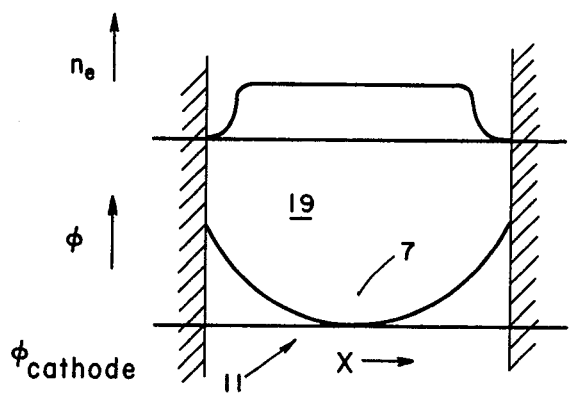
Figure 3C:
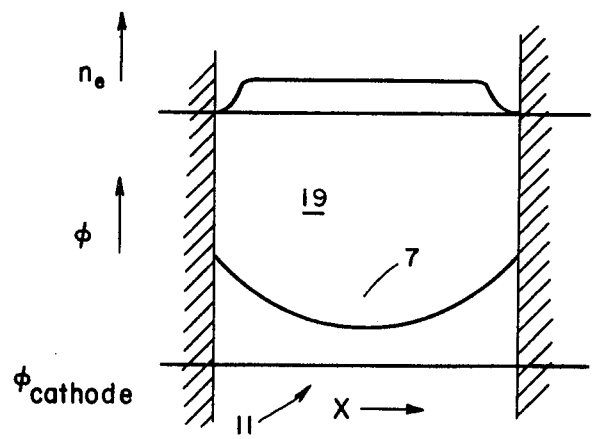

In arriving at a first approximation of the electron density variation perpendicular to the magnetic field with an unlimited emission of electrons at the cathode, the electrons may be thought to form two thin sheets with the outer boundary of each sheet determined by scrape-off to an aperture-limiting protuberance. FIG. 3a illustrates this density profile and the pertinent potential variation, while recognizing a possible thickness of the sheets as small as the Larmor diameter of the electrons at the cathode temperature. However, the diocotron instability will tend to broaden out these thin sheets, FIG. 3b. Furthermore, while the high electron density of the twin-thin sheets configuration of FIG. 3a tends to raise the ionization rate, the low kinetic energy of the electrons operate as a deleterious factor via reduction of $\langle \sigma v_e \rangle$. To avoid this condition, one may rely not only on the diocotron instability to raise the average electron kinetic energy but can also consider limiting the cathode emission to diminish the depth of the space charge well 11. FIG. 3c illustrates a potential profile that eliminates the virtual cathode in this manner.

However, collisional relaxation that tends to increase $n_e$ in regions of maximum $\Phi$, i.e., tending toward $n_e \approx exp[e\Phi 9z 0/kT_{ea}]$, still limits the favorable density and potential profile of FIG. 1. As a specific example, electrons that undergo collisions in the vicinity of the potential maxima can lose enough parallel energy to remain trapped in these regions. Ionization additionally frees trapped electrons in these same locations. Moreover, in the modified P.I.G. configuration of FIG. 1, the space charge of the trapped electrons lowers the height of the potential maxima and accordingly reduces the ability of that configuration to confine ions.

Also, the rate of entrapment of electrons by collision equals $(t_c)^{1 a1}$ in eq. (6), and the production of free electrons via ionization in the regions of the potential maxima obeys a rate equation in the form of eq. (4). Thus, these two processes can destroy the ion-confining potential maxima by filling the same with trapped electrons in a time comparable or short compared to the desired ion confinement time. This invention therefore, thus advantageously provides for the removal of the trapped electrons from the plasma while retaining those electrons that execute full cathode-to-cathode oscillations.

Figure 4:
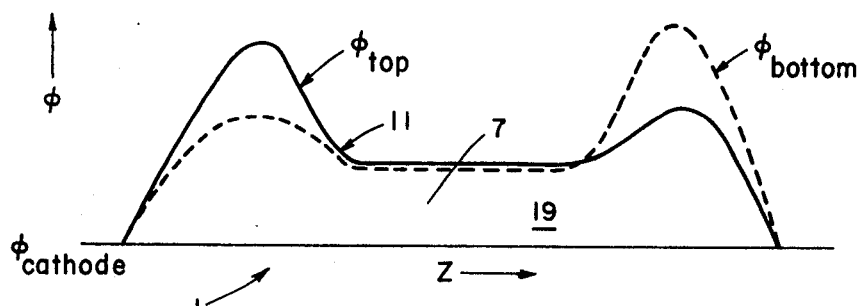
FIG. 4 is a sketch of potential versus $z$ showing drift fields for removing trapped electrons. Potentials along lines of magnetic force near top-center and near bottom-center of the modified P.I.G. device are depicted.

To this end, in accordance with the described embodiment of this invention, a sideways E×B drift ejects electrons trapped in the two ion-confining potential maxima 13 and 15. Thus, for example the E field in the $x$-direction superimposes on the existing electric field in each of the regions of the potential maxima, but in opposite directions, as illustrated by FIG. 4. Electrons executing full end-to-end oscillations displace oppositely in the $\pm y$-directions as they pass through the two regions of the potential maxima of the double humps 13 and 15 of profile 11. Thus, electrons transversing the slab device 1 of this invention, sum up to zero displacement to close the orbits of the electron oscillations. However, the electrons trapped in one end of the slab device 1 experience drift displacements always in the same direction due to the described E×B drift thereby to transport and eject electrons from the sides of the device 1 for collection by suitably placed collecting electrodes biased at high potentials.

Figure 5A:
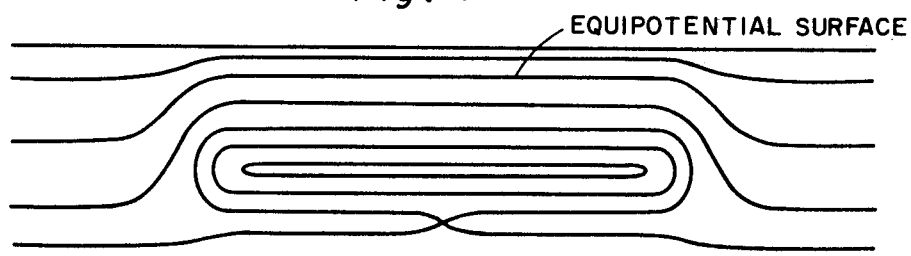
FIG. 5(a) and FIG. 5(b) are cross sections, perpendicular to B, of equipotential surfaces in the clearing field region. Sketch (b) shows the configuration when the additional E field is sufficiently strong to open up all the equipotentials. In (a), corresponding to a smaller imposed field, a portion of the electron cloud potential well remains undestroyed.

Advantageously, the drift E field exceeds a predetermined minimum strength, since without this E drift, the equipotential lines of the plasma take the shape represented by the drawing of FIG. 2b, while the space charge of the electron cloud produces the potential well in this section perpendicular to B. Since the electrons drift in the E×B direction in their motion perpendicular to B, their trajectories tend to follow such equipotentials. Thus, as illustrated in FIG. 5a, a modest E field does not open up all the closed equipotentials thereby tending to leave trapped the electrons drifting along the closed lines.

Figure 5B:
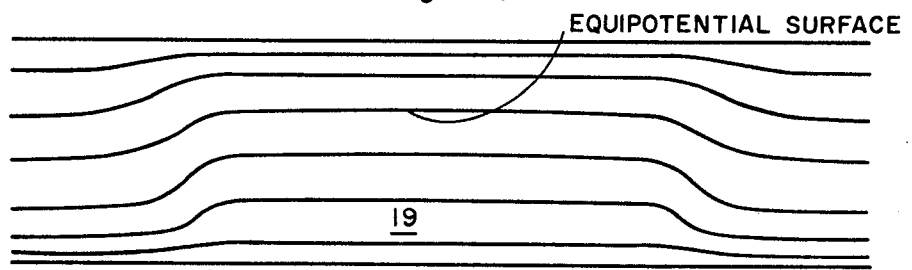

FIG. 5b illustrates the equipotentials when a sufficiently strong E field opens up all the closed lines, thereby permitting all the trapped electrons to drift out of the plasma 19 in central region 7. For an electron cloud of uniform density from the top to the bottom wall, the potential to make $E_x$ have the same sign everywhere, equals $4 \Delta \Phi$, i.e., $$\Phi_{top} - \Phi_{bottom} = 4\Delta\Phi$$

where $\Delta \Phi$ equals the depth of the well 11, in the absence of the clearing field, due to an electron cloud of the same density. Also, the charge density of the untrapped electrons is reduced in the region of increased potential due to the higher velocity of the particles there.

While the removal of trapped electrons by the clearing field could locally produce a double-humped electron velocity distribution, and thereby tend to produce a two-stream instability mechanism, the short $z$—extent of the trapping volume, the velocity shear $v_z(x)$ due to the clearing field, and the velocity spread of the untrapped electrons advantageously suppresses this instability.

In a practical device for producing a slab geometry in accordance with this invention, there prevails a small ionization cross section of already ionized heavy nuclei, typically $\leq 10^{120}$ cm.$^2$, thus requiring a long ion confinement time, typically $\geq 0.1$ second for the desired highly stripped states. The following, therefore, examines the process for the ion formation and ion loss.

Electron impact causes the ionization. On each such impact the potential energy of the ion changes by the amount $e \Phi$ (the electron acquiring $-e \Phi$ potential energy), and the total energy acquired by an ion equals $e \Sigma \Phi (r_j)$ where $r_j$ equals the position at which the $j$th ionization step occurred. The average ion energy per stripped electron equals one-third the depth of a parabolic well 11 with homogeneous ionization. The average ion kinetic energy per stripped electron, therefore, equals one-sixth the well depth, with the energy divided among the three degrees of freedom for ion motion.

Ions escape from the potential well 11 with their kinetic energy in the $\Delta\Phi$ direction exceeds the potential barrier height at that point. However, escaping ions carrying an average amount of energy perpendicular to $\Delta\Phi$ will transport at least $10e\Delta\Phi/9$ per stripped electron, or ten-thirds times the average total energy ($\Phi_{min} \equiv 0$) for the ion plasma. Therefore, the remaining ions have proportionally less kinetic energy and lie deeper in the potential well 11.

Figure 6:
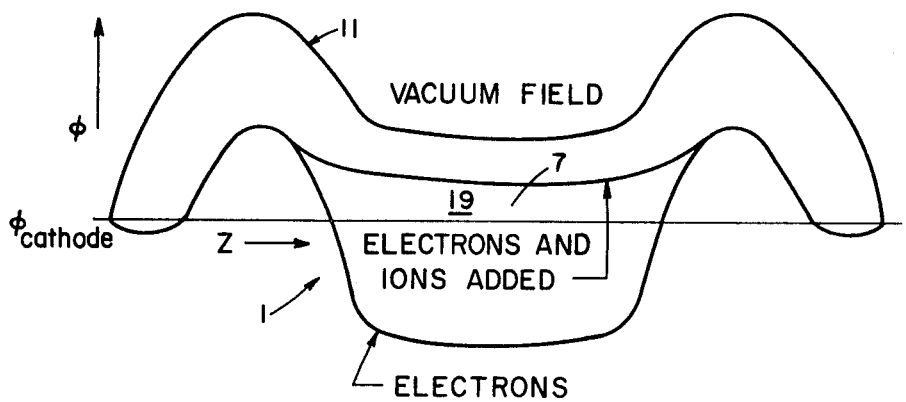
FIG. 6 is a sketch of electric potential, $\Phi$, versus $z$ showing the contributions to $\Phi$ from the space charge of the electron and ion clouds. Of particular interest is the reduction of height in the ion-confining barrier.

By this means, the collisional ion loss mechanism involves only the "tail" of the ion distribution with a self-limiting loss rate due to the selective nature of the process. More importantly in the practical sense the accumulation of positive charge weakens the confining potential well 11. In FIG. 6, which illustrates the potential variation in one possible steady-state condition, the uppermost curve represents the vacuum electric potential along the centerline of the modified P.I.G. device 1 of this invention having a double-humped potential profile 11. The lowermost curve illustrates the electrical potential added to the electron space-charge effects. The further addition of ion space-charge produces the middle curve, with the deviation of this middle curve from the cathode potential depending on the extent of limitation of the cathode current. The presence of ion space-charge tends to increase the potential in the central region 7, and thus reduces the relative height of the potential barriers of well 11. Also, the ion-confining well 11 becomes shallower with diminished volume. Moreover, although ions form and reionize in the well 11, their loss over the potential barriers at the ends of the device 1, as reduced in height, balances their accumulation rate.

Restating the situation another way, an increasing rate of ion formation increases the positive component of the space-charge in the central region 7 represented in FIG. 6, thereby reducing the effective barrier height and increasing the rate of ion end loss. On the other hand, an increasing electron emission lowers the net potential in the central region 7 but also lowers the height of the potential in the regions of the ion confining barriers 13 and 15, with the net results of very little change of barrier height.

In this regard, judicious adjustment of the ion loss process controls the extraction of stripped ions from the *rti* source 1 of this invention. Accordingly, this device 1 produces a steady stream of ions out the ends thereof. However, the device 1 can alternately provide pulsed operation. To this end, a negative pulse applied to one of the potential hump-producing electrodes causes the ion-confining barrier temporarily to lower to release a cloud of stripped ions. Pulsing just a section of one of these electrodes focuses the stream of ejected ions.

Figure 7:
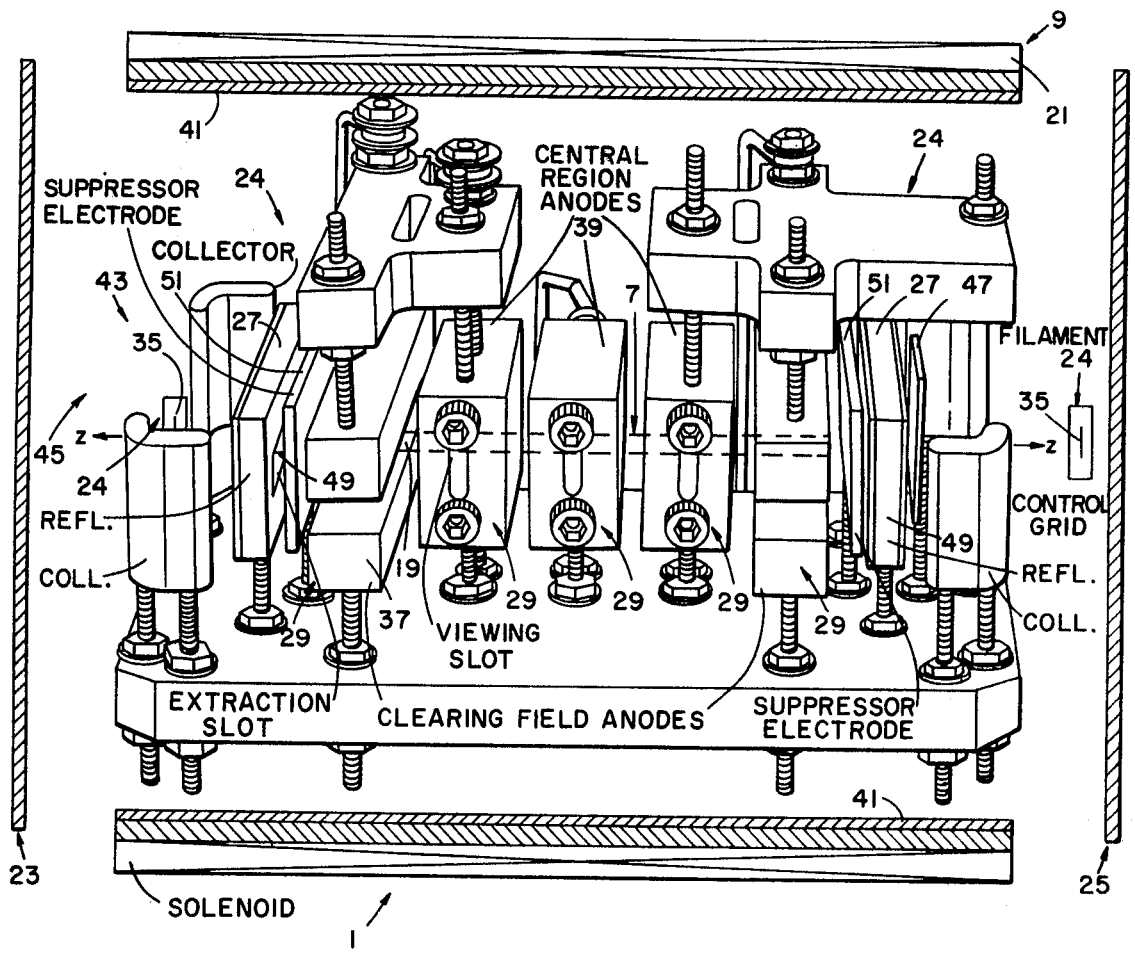
FIG. 7 illustrates a partial, small scale, three-dimensional view of one embodiment of the modified P.I.G. device of FIG. 1.

The small test device 1 shown in FIG. 7 has an iron-core magnet 21 that produces a 10,000 gauss magnetic field between pole pieces 23 and 25 forming a 5-inch gap. The reflectors 27 have a 5.6 cm. separation, and the ion-confining region 7 has 4.6 cm. length, a 3 cm. width and a 0.3 cm. thickness. The anode electrodes 29 have a 10 kv. potential, oppositely directed and 20 kv. clearing fields are applied to electrodes 37.

An 0.08 cm. wide hot tungsten ribbon 24 oriented in the $x$-direction, emits into the plasma through an 0.05 cm. by 0.3 cm. slot 33 in the reflector electrode 27 for a plasma 19 having a corresponding full thickness. The above-described E×B drift carries the electrons along the equipotentials, as shown in FIG. 2, thereby filling the volume inside the rectangular electrodes. Adjustment of the bias voltage on the filament 24 and the control grid 47 between the filament 24 and the reflector 27 controls the injection current into the active volume 7. The outer anode pairs 37 of the five separate anode electrodes 29 placed between the two reflector electrodes 27, provide the double-humped, ion-confining potential profile 11 and the clearing field. The inner three anodes 39 produce the central field in central region 7, while giving some flexibility in adjusting the shape of the central potential.

A bakeable ultra-high vacuum is provided in a suitable enclosure 41 around the device 1. Also provision is made for steady-state or intermittent pulsed operation of the clearing field, as well as the control grid 35 and one of confining anodes 29 for studying the buildup and decay of the plasma, and to dump the plasma.

The diagnostics rely on measuring the electrode currents under steady-state and pulsed operation, and on studies of the intensity and apparent source region of the spectral lines emitted from the different charge states. These diagnostics in combination with the negative pulsing of the one of the confining anodes 29, allow the ions to pass out end 43 of the device 1 and through a hole 45 in the pole piece 23 to an analyzer (not shown for ease of explanation).

Advantageously also, careful control over the gas supply of neutral gas to the plasma volume controls the ion formation process. Likewise, the *rti* source device 1 of this invention requires careful control of the emission from filament 24, and has a control grid 47. With this control, the spatial extent of the plasma 19 fills the rectangular area between the cross section of anodes 24. Adjustment of the bias voltage on the filament 24 and on the control grid 47 between the filament 24 and near the reflector 27 controls the injection current into the active volume 7 of the plasma 19. Additionally, biasing a pair of suppressor electrodes 51 adjacent each reflector 27 drives back secondary electrons released from the electrode surfaces of reflector 27. Next come the outer anode pairs 37 that produce the ion-confining potential maxima and the clearing fields, while the three middle anode pairs 39 set the potential of the control region 7. Also, although the diocotron and two-stream instabilities can tend to exist, and the removal of trapped electrons by the clearing fields can produce locally a doubled-humped electron velocity distribution, the above-described control helps provide the short $z$-extent of the trapping volume, the velocity shear $v_z(x)$ due to the clearing field, and the velocity spread of the untrapped electrons advantageously to suppress the latter instability.

With control of the two-stream instability and control of the buildup of the electron density, comprising control of the diocotron instability, as described above, then eq. (2) for a $q$ of 0.03 gives $\omega_w = 10^{112}$ years, and the corresponding electron density at $B=10,000$ gauss equals $3 \times 10^{11}$ cm.$^{13}$. Likewise, for a slab thickness of $d=0.3$ cm. eq. (1) provides a well depth of 6,100 volts. Additionally, a 10 kv. potential on the central of the anodes 39, provides a mean electron energy of about 5,900 ev., corresponding to an RMS electron velocity of $4.5 \times 10^9$ cm./sec. In this example, the surface through flux of electrons corresponds to a current in each direction of about 60 amperes per cm.$^2$.

From the above described example, for $A=10$ cm.$^2$, $Zn_{j11}/n=0.1$, and $\sigma=10^{120}$ cm.$^2$, eq. (4) then corresponds to a production rate of $1.2 \times 10^{12} Z^{11}$ ions per second, equivalent to an ion "current" of 0.2 microamperes. Following therefrom, the average ionization time, with $\sigma=10^{120}$ cm.$^2$, equals 75 milliseconds, and the electron-scattering time from eq. (6), equals 25 milliseconds. Using this latter time as approximate to the electron-trapping rate, then, an injection current of $6\mu$ amperes suffices to replenish the ejected trapped electrons. The comparison of the injection current to the 60 ampere/cm.$^2$ energetic electron flux in the central plasma region 7 corresponds to the effectiveness of the electron confinement.

While the above has described an embodiment for producing the double-humped electrostatic potential well of this invention in a slab geometry, as herein understood in the art from this description, various other embodiments will come within the preview of this invention, as likewise understood in the art from the description herein.

Also, the described and/or other embodiments of this invention, as understood in the art, may provide the described E×B apparatus for removing trapped electrons or other like apparatus for performing the same function.

This invention has the advantage of providing a double-humped electrostatic profile for producing and reactively confining ions in an improved P.I.G. configuration. To this end, the invention provides a slab geometry, provides novel E×B means for removing trapped electrons. Accordingly, this invention has the advantage of providing an improved P.I.G. means for producing and confining highly stripped ions, comprising heavy ions, for a wide variety of applications, such as the production of transuranium elements, for high-energy and/or low-energy physics, and/or for a wide variety of medical or other applications.

I claim:

1. In an ion source of the type having a gas source, means for producing a magnetic field and a cloud of energetic electrons in said field for producing ions from a gas from said source, the improvement comprising means forming a double-humped electrostatic potential profile immersed in said field for confining said electron cloud and said ions for relatively long periods of time for producing highly stripped heavy ions from a gas from said gas source.

2. The invention of claim 1 having means for producing a transverse electric field for removing electrons undesirably trapped in positive potential maxima of said double-humped electrostatic potential profile, thereby to prevent said electrons from accumulating therein so as to neutralize the ion-confining operation of said positive potential maxima.

3. The invention of claim 1 in which the electrodes are so disposed and biased so as to cause the individual injected energetic electrons advantageously to make numerous transits through the ion cloud.

4. The invention of claim 1 in which said means forming said double-humped electrostatic potential profile has a slab geometry for producing a slab-shaped electron cloud in said profile.

5. The invention of claim 1 in which each hump of said double-humped electrostatic profile substantially corresponds in potential strength with the other corresponding hump of said double-humped electrostatic profile.